2,902,515

PREPARATION OF UNSATURATED ALDEHYDES

Marc Montavon, Basel, and Gabriel Saucy, Neuewelt, Munchenstein, Switzerland, assignors to Hoffmann-La Roche Inc., Nutley, N.J., a corporation of New Jersey No Drawing. Original application August 22, 1956, Serial No. 605,462. Divided and this application March 10, 1958, Serial No. 720,034

Claims priority, application Switzerland September 2, 1955

7 Claims. (Cl. 260—598)

This invention relates to novel processes of making organic compounds. More particularly, the invention is concerned, in one of its aspects, with novel processes and novel intermediates for making $\alpha,\beta$-unsaturated aldehydes; and in another of its aspects, with novel processes for making unsaturated ketones.

The novel processes provided by the invention for making $\alpha,\beta$-unsaturated aldehydes can be characterized broadly as comprising a stage wherein a 3,3-disubstituted allyl halide is reacted with an alkali metal salt of a nitronic acid, thereby forming a nitronic acid ester; and a further stage wherein said nitronic acid ester is decomposed, thereby forming an $\alpha,\beta$-unsaturated aldehyde.

In a more limited embodiment, the invention relates to a process which comprises reacting a 3,3-disubstituted allyl halide having the Formula I (I) $\qquad$ B=C=CH—CH$_2$—X wherein the symbol X represents a halogen selected from the group consisting of chlorine and bromine, and the symbol group B=C= represents a disubstituted methylene radical selected from the group consisting of dialkylmethylene, alkylalkenylmethylene, cycloalkylidene and cycloalkylidene substituted in the ring only by at least one substituent of the class consisting of lower alkyl, lower alkoxy, lower alkanoyloxy, oxo and ketalized oxo, with an alkali metal salt of a lower alkanenitronic acid, thereby forming a nitronic acid ester having the Formula II (II) 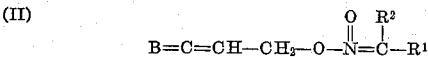

wherein the symbol R$^1$ represents a lower alkyl radical and the symbol R$^2$ represents a member selected from the group consisting of hydrogen and lower alkyl radicals, the sum of the carbon atoms in R$^1$ and R$^2$ being less than 6; and the symbol group B=C= has the same meaning indicated above; and decomposing said nitronic acid ester (II), thereby forming an $\alpha,\beta$-unsaturated aldehyde having the Formula III (III) 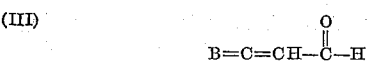

wherein the symbol group B=C= has the same meaning indicated above.

Illustrative 3,3-disubstituted allyl halides, Formula I above, suitable for use in the processes of the invention include: 3,3-dialkylallyl halides ["alkyl" being understood to include saturated hydrocarbon radicals with cyclic structure, such as cycloalkyl-alkyl, e.g. cyclohexyl-propyl], e.g. 3-methyl-2-buten-1-yl chloride [alternative nomenclature: 3,3-dimethylallyl chloride], 1-bromo-3,7-dimethyl-2-octene [alternative nomenclature: 3-methyl-3-(4-methyl-1-pentanyl)-allyl bromide], tetrahydrofarnesyl bromide [alternative nomenclature: 3-methyl-3-(4,8-dimethyl-1-nonanyl)-allyl bromide], and the like; 3-alkyl-3-alkenylallyl halides ["alkenyl" being understood to include both alka(mono)enyl radicals and alka(poly)enyl radicals as well as olefinic hydrocarbon radicals with cyclic structure, such as cycloalkyl-alkenyl, e.g. 3-cyclohexylidene-propyl], e.g. 1-bromo-3,7-dimethyl-2,6-octadiene [alternative nomenclature: 3-methyl-3-(4-methyl-3-penten-1-yl)-allyl bromide], 1-bromo-3-methyl-6-cyclohexylidene-2-hexene [alternative nomenclature: 3-methyl-3-(3-cyclohexylidene-propyl)-allyl bromide], 1-chloro-3,7,9-trimethyl-2,6-decadiene [alternative nomenclature: 3-methyl-3-(4,6-dimethyl-3-hepten-1-yl)-allyl chloride] farnesyl bromide, phytyl chloride, and the like; and 2-cycloalkylideneethyl halides, and 2-cycloalkylideneethyl halides substituted only in the nucleus by at least one substituent of the class consisting of lower alkyl, lower alkoxy, lower alkanoyloxy, oxo and ketalized ozo; e.g. 3-cyclohexylideneethyl bromide, 3-cyclopentylideneethyl chloride, 3-cycloheptylideneethyl bromide, 2-(4-methyl-1 - cyclohexylidene)ethyl chloride, 2 - (2,6,6 - trimethyl - 1 - cyclohexylidene)ethyl bromide, 2 - (2 - isopropyl - 5 - methyl - 1 - cyclohexylidene)ethyl bromide, 2-(2,2,6,6 - tetramethyl - 1 - cyclohexylidene)ethyl bromide, 2 - (4 - methoxy - 1 - cyclohexylidene)ethyl chloride, 2 - (4 - acetoxy - 1 - cyclohexylidene)ethyl bromide, 2 - (4 - acetoxy - 2,6,6 - trimethyl - 1 - cyclohexylidene)ethyl bromide, 2 - (4 - oxo - 1 - cyclohexylidene)ethyl chloride, 2 - (4,4' - dimethoxy - 1 - cyclohexylidene)ethyl bromide, and 2 - (4 - ethylenedioxy-2,6,6-trimethyl-1-cyclohexylidene)ethyl bromide, and the like.

Whereas chlorides and bromides are specifically identified in the preceding illustrations, it should be understood that fluorides and iodides can also be used.

Illustrative alkali metal salts of nitronic acids which can be used include especially alkali metal lower alkanenitronates, e.g. potassium methanenitronate, potassium ethanenitronate, sodium-2-propanenitronate, potassium-1-propanenitronate, lithium-2-n-butanenitronate, and the like. Whereas the alkali metal salts of any nitronic acid (i.e., a primary or secondary organic nitro compound capable of existing in the aci-form) can be used, it is preferred to use an alkali metal salt (and preferably a sodium or potassium salt) of a lower alkanenitronic acid. Ordinarily, salts of secondary nitronic acids (e.g. 2-propanenitronic acid) are preferred to those of primary nitronic acids (e.g. 1-propanenitronic acid).

The reaction is advantageously effected by mixing the allylic halide with the alkali metal nitronate in the presence of a diluent, at temperatures between about —10° C. and about 80° C. In most cases, depending upon the starting materials used and the diluent, the preferred range of temperature is between about 0° C. and about 50° C. Suitable diluents include, for example, water; monohydric and polyhydric alcohols, e.g. ethanol, isopropanol, t-butanol, mono- and diethyleneglycol; ethers, e.g. dioxan, tetrahydrofuran and diethyleneglycol ethyl n-butyl diether; amides, e.g. dimethylformamide; acetals, e.g. methylal; nitriles, e.g. acetonitrile; and the like. Ordinarily, it is preferred to use an inert diluent, i.e. one which reacts with neither the allylic halide reactant, the alkali metal nitronate reactant, the nitronic acid ester intermediate nor the $\alpha,\beta$-unsaturated aldehyde product. However, in certain instances, as discussed below, it is desirable to employ diluent material which reacts, at least in part, with the aldehyde product.

In one mode of operation which has been found suitable, the alkali metal nitronate is prepared by reacting a lower nitroalkane with an aqueous solution of an alkali metal hydroxide (preferably aqueous NaOH or aqueous KOH), and the thus obtained aqueous solution of alkali metal lower alkanenitronate is mixed with the allylic halide, in the presence of a diluent, at temperatures between about 0° C. and about 50° C.

In another advantageous mode of execution, the alkali metal nitronate is prepared by mixing a lower nitroalkane with an alkali metal lower alkoxide (e.g. potassium-t-butoxide dissolved in t-butanol), and the thus obtained alcoholic solution or suspension of the alkali metal nitronate is mixed with the allylic halide, if desired in the presence of additional diluent, at temperatures between about 0° C. and about 50° C.

Still another procedure which has been found suitable is to prepare the alkali metal nitronate by introducing the nitro compound into a suspension of finely divided anhydrous alkali metal hydroxide in an acetal (e.g. methylal) or an ether (e.g. diethyleneglycol ethyl n-butyl diether), and stirring the mixture obtained, at about room temperature, with the allylic halide.

Depending upon the particular reactants and diluents employed, the reaction mixture either takes the form of a homogeneous system or separates into layers. In the latter case, it is advantageous to obtain intimate contact between the phases by thorough mixing.

Because of thermal influences, even at the relatively low temperatures employed, the nitronic acid ester formed at an intermediate stage decomposes spontaneously, thereby yielding the desired α,β-unsaturated aldehyde.

In one preferred embodiment, the invention provides a process of making a monoolefinic α,β-unsaturated aldehyde which comprises mixing a 3-alkylcrotyl halide with an alkali metal salt of a lower alkanenitronic acid in the presence of an inert liquid diluent at temperatures between about −15° C. and about 50° C. For example, by stirring 1-bromo-3,7-dimethyl-2-octene [alternative nomenclature: 3-(4-methyl-1-pentanyl)-crotyl bromide] with potassium-2-propane-nitronate in the presence of a mixture of acetonitrile and water at temperatures between about 40° C. and about 45° C., 3,7-dimethyl-2-octen-1-al is obtained in good yield.

In a second preferred embodiment, the invention provides a process of making a polyolefinic α,β-unsaturated aldehyde which comprises mixing a 3-alkenylcrotyl halide with an alkali metal salt of a lower alkanenitronic acid in the presence of an inert liquid diluent at temperatures between about −15° C. and about 50° C. For example, by stirring 1-bromo-3,7,9-trimethyl-2,6-decadiene [alternative nomenclature: 3-(4,6-dimethyl-3-hepten-1-yl)crotyl bromide] with potassium-1-propanenitronate in the presence of a mixture of water and isopropanol at temperatures between about 40° C. and about 45° C., 3,7,9 - trimethyl - 2,6 - decadien-1-al is obtained in good yield.

In a third preferred embodiment, the invention provides a process of making a cyclic α,β-unsaturated aldehyde which comprises mixing a cyclic allylic halide selected from the group consisting of 2-cycloalkylideneethyl halides and their nuclear substituted derivatives wherein the substituents are selected solely from the class consisting of lower alkyl, lower alkoxy, lower alkanoyloxy, oxo and ketalized oxo with an alkali metal salt of a lower alkanenitronic acid in the presence of an inert liquid diluent at temperatures below about 40° C. For example, by reacting 2-(4 - acetoxy - 2,6,6 - trimethyl-1-cyclohexylidene)ethyl bromide with potassium-2-propanenitronate in the presence of a mixture of water and dimethylformamide at temperatures between about 20° C. and about 30° C., 4 - acetoxy-2,6,6-trimethyl-1-cyclohexylideneacetaldehyde is obtained in good yield.

As indicated previously, it has been found to be desirable, in certain embodiments of the invention, to use a diluent which is itself reactive with the α,β-unsaturated aldehyde formed by reaction between the allylic halide and the alkali metal nitronate. Thus, it has been found that acyclic multiply unsaturated ketones, containing within their structure the fundamental carbon skeleton characteristic of pseudoionone, can be made by reacting first certain 3-alkenylcrotyl halides with alkali metal nitronates and by adding then an alkaline agent in the presence of certain lower aliphatic ketones. The acyclic multiply unsaturated ketones so produced are readily cyclized upon treatment with acidic reagents, yielding α- and β-ionones and homologs and analogs thereof. Thus, in still another of its preferred embodiments, the invention provides a process of making an unsaturated cyclic ketone which comprises mixing a 3-alkenylcrotyl halide having the Formula IV.

(IV) 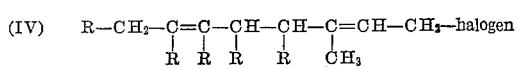

wherein each of the symbols R represents a member selected from the group consisting of hydrogen and lower acyclic hydrocarbon radicals at temperatures between about −10° C. and 80° C., with an alkali metal salt of a lower alkanenitronic acid, in the presence of a ketone having the Formula V (V) 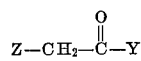

wherein Z represents hydrogen or an acyclic hydrocarbon radical and Y represents an acyclic hydrocarbon radical, the sum of the carbon atoms in the radicals Z and Y being less than 6, adding an alkaline agent thereby producing an unsaturated acyclic ketone having the Formula VI (VI) 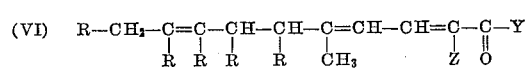

wherein the symbols R, Z and Y have the same meanings indicated above; and treating said unsaturated acyclic ketone (VI) with an acidic cyclizing agent, thereby obtaining a cyclic unsaturated ketone having one of the following Formulas VII and VIII (VII) 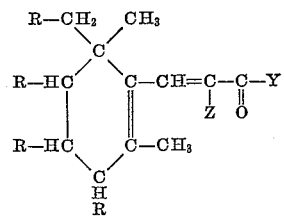

(VIII) 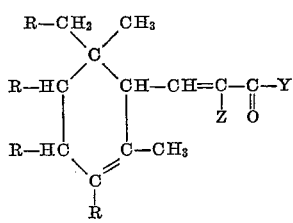

wherein the symbols R, Z and Y have the same meanings indicated above.

Suitable 3-alkenylcrotyl halides, Formula IV above, for use in practicing the last mentioned embodiment of the invention include, for example, 1-bromo-3,7-dimethyl-2,6-octadiene, 1-bromo-3,6,7-trimethyl-2,6-octadiene, 1-chloro-3,7-dimethyl-2,6-nonadiene, 1 - bromo - 3,7,9 - trimethyl-2,6-decadiene and the like.

Suitable ketones, Formula V above, for use in practicing the last mentioned embodiment of the invention include, for example, acetone, methyl ethyl ketone, diethyl ketone, di-n-propyl ketone, methyl vinyl ketone, methyl propargyl ketone and the like.

The 3,3-disubstituted allyl halide starting materials of the invention, Formula I above, can, in general, be made by ethinylating a ketone having the formula (IX)     B=C=O thereby obtaining an acetylenic tertiary carbinol having the formula (X) 

catalytically hydrogenating the latter in the presence of a selective hydrogenation catalyst (e.g. of the type disclosed by Lindlar, Helvetica Chimica Acta 35, 446 [1952]), thereby producing the corresponding olefinic tertiary carbinol, having the formula (XI) 

and halogenating the latter, for example by treating with phosphorus tribromide in an inert solvent or anhydrous hydrogen chloride in an inert solvent, or by treating with concentrated aqueous hydrochloric acid or concentrated aqueous hydrobromic acid. (In the above formulas, the symbol group B=C= has the same meaning indicated previously.)

The α,β-unsaturated aldehydes and the cyclic unsaturated ketones obtained by the processes of the invention are useful in perfumery as odor-imparting agents, and in organic synthesis as intermediates in the preparation of vitamin A and carotenoids.

The invention is further disclosed in the following examples, which are illustrative but not limitative thereof.

*Example 1*

10 g. of 2-nitropropane were added slowly, while stirring and cooling to 10°–20° C., to a mixture of 6.9 g. of solid potassium hydroxide (containing 85% by weight KOH), 7 ml. of water and 30 ml. of t-butanol. The solution thus obtained was mixed quickly with a solution of 21.7 g. of 1-bromo-3,7-dimethyl-2,6-octadiene in 60 ml. of t-butanol, and the mixture was stirred for several hours at 25° C., with cooling as necessary, potassium bromide being thereby precipitated. Then 200 ml. of water were added and the mixture was extracted with petroleum ether. The petroleum ether extract was washed with cold aqueous 1 N sodium hydroxide solution and with water, dried over sodium sulfate, and then the solvent was distilled off. There were thus obtained 15.2 g. of 3,7-dimethyl-2,6-octadien-1-al, having an absorption maximum in the ultraviolet spectrum at 232 mμ (in petroleum ether). The material was purified by distillation in vacuo, thereby yielding a colorless form having B.P. 102°–104° C., $n_D^{27}=1.482$.

*Example 2*

10 g. of 2-nitropropane were added slowly, while stirring and cooling to 15°–25° C., to a mixture of 5.6 g. of solid sodium hydroxide (containing 85% by weight NaOH), 10 ml. of water and 30 ml. of dimethylformamide. The resulting mixture was mixed with a solution of 21.7 g. of 1-bromo-3,7-dimethyl-2,6-octadiene in 90 ml. of dimethylformamide. The reaction mixture was stirred for 15 hours at 25°–30° C. and was then worked up in the manner indicated in Example 1. There were thus obtained 14.3 g. of 3,7-dimethyl-2,6-octadien-1-al.

*Example 3*

10 g. of 2-nitropropane were introduced slowly at 25° C., while stirring, into a mixture of 2.8 g. of lithium hydroxide (85% pure), 10 ml. of water and 30 ml. of dimethylformamide, and the stirring was continued for 30 minutes. Then a solution of 21.7 g. of 1-bromo-3,7-dimethyl-2,6-octadiene in 90 ml. of dimethylformamide was added. The reaction mixture was stirred for 15 hours at 25°–30° C., and was then worked up as in Example 1, yielding 14.6 g. of 3,7-dimethyl-2,6-octadien-1-al.

*Example 4*

A solution of 17.3 g. of 1-chloro-3,7-dimethyl-2,6-octadiene in 60 ml. of dimethylformamide was reacted, in the manner described in Example 1, with a solution of 10 g. of 2-nitropropane and 6.9 g. of potassium hydroxide (85% pure) in 7 ml. of water and 30 ml. of dimethylformamide. Upon working up the reaction mixture as in Example 1, there were obtained 14 g. of 3,7-dimethyl-2,6-octadien-1-al.

*Example 5*

1.3 g. of potassium hydroxide (85% pure) in 26 ml. of diethyleneglycol ethyl n-butyl diether were heated for one hour at 150° C., while stirring. Then the reaction mixture was cooled to 10° C. while stirring vigorously, 2 g. of 2-nitropropane were added, and the stirring was continued for one hour at 20° C. 4.4 g. of 1-bromo-3,7-dimethyl-2,6-octadiene were then added, and the reaction mixture was stirred for 15 hours at 25°–30° C. The mixture was diluted with 80 ml. of water and worked up as described in Example 1, yielding 3.1 g. of 3,7-dimethyl-2,6-octadien-1-al.

*Example 6*

10 g. of 2-nitropropane were introduced slowly, while stirring and cooling, into a solution of 3.9 g. of potassium in 100 ml. of t-butanol. The mixture obtained was mixed quickly with 23.1 g. of 1-bromo-3,7-dimethyl-2,6-nonadiene and the reaction mixture was stirred for 20 hours at 25° C. Then the reaction mixture was poured into 200 ml. of ice water, and the mixture was extracted with petroleum ether. The petroleum ether extract was washed with dilute aqueous sodium hydroxide solution and with water, dried over sodium sulfate, and the solvent was distilled off. There were thus obtained 16.6 g. of 3,7-dimethyl-2,6-nonadien-1-al, having an ultraviolet absorption maximum at 232 mμ (in petroleum ether). Upon purification by distillation in vacuo, the material had B.P. 70° C./0.15 mm., $n_D^{25}=1.483$. This aldehyde had a fine fragrance reminiscent of citrus fruits.

The allylic halide used as starting material in this example, 1-bromo-3,7-dimethyl-2,6-nonadine, can be made by the following procedure:

600 g. of 3-methyl-1-penten-3-ol were cooled to 15° C. with an ice bath, then 1800 ml. of concentrated aqueous hydrochloric acid (37% by weight HCl) were poured into the reaction vessel. The mixture was stirred for 30 minutes. The oil, comprising essentially 1-chloro-3-methyl-2-pentene, was separated, washed three times with 500 ml. of water and tried over calcium chloride.

Four liters of benzene, 1040 g. of ethyl acetoacetate and 378 g. of sodium methylate were stirred into a 12 liter flask. 696 g. of 1-chloro-3-methyl-2-pentene as produced in the preceding paragraph were added from a separatory funnel in 2 hours at 60° C. The stirring was then continued at 60° C. overnight.

The mixture was diluted with four liters of water. The oil was separated and the benzene was distilled off under vacuum. The thick residue, 3-carbethoxy-6-methyl-5-octen-2-one, was placed in a 5 liter flask with 2 liters of ethyl alcohol, 1 liter of water and 500 g. of potassium hydroxide. This was stirred for two hours, then allowed to stand overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water-washed and fractionated to yield 6-methyl-5-octen-2-one, distilling at 65° C./10 mm., $n_D^{25}=1.4412$.

84 g. of metallic sodium were dissolved in 3 liters of liquid ammonia. Acetylene was bubbled into the stirred solution until its color changed from blue to white. 420 g. of 6-methyl-5-octen-2-one were dissolved in 500 ml. of diethyl ether and dropped into the stirred reaction mixture in one hour. Stirring was continued for 3 hours while a slow stream of acetylene was bubbled in. The acetylene was then stopped, but the stirring was continued for about 15 hours. The ammonia was then distilled off and the residue in the reaction vessel was washed with 2 liters of 5% aqueous sulfuric acid. The product was water-washed, dried over anhydrous calcium sulfate and fractionated to yield 3,7-dimethyl-6-nonen-1-yn-3-ol, distilling at 89° C./10 mm., $n_D^{25}=1.4612$.

300 g. of 3,7-dimethyl-6-nonen-1-yn-3-ol, 30 g. of 5% lead-palladium-calcium carbonate catalyst [Lindlar, Helvetica Chimica Acta 35, 46 (1952)], and 300 ml. of petroleum ether were placed in a flask provided with a stirrer and hydrogenated at 25°–30° C. at one atmosphere hydrogen pressure until 1.9 mols of hydrogen were consumed. Fractionation of the product gave 3,7-dimethyl-1,6-nonadien-3-ol, distilling at 132° C./86 mm., $n_D^{25}=1.4603$.

110 g. of 3,7-dimethyl-1,6-nonadien-3-ol, dissolved in 500 ml. of absolute ether, were cooled to —10° C. To this were added slowly with stirring 85 g. of phosphorus tribromide, at such a rate as to keep the temperature in the reaction vessel below 0° C. The addition required one hour. The mixture was stirred an additional hour at —5° C. and then poured into cold water. The organic layer was separated, washed with sodium hydrogen carbonate solution and with water, then dried over sodium sulfate. The solvent was driven off, yielding 150 g. of 1-bromo-3,7-dimethyl-2,6-nonadiene, $n_D^{25}=1.493$.

Example 7

44 g. of potassium hydroxide were dissolved in 70 ml. of water, the solution was diluted with 450 ml. of isopropanol, whereupon 64 ml. of 2-nitropropane were added slowly, with stirring, at 20° C. The mixture was stirred further for 5 minutes and 164 g. of 1-bromo-3,7,9-trimethyl-2,6-decadiene were added at once. The temperature was maintained at about 40–45° C. Once the exothermic reaction was over, the mixture was heated to 45° C. for 20 minutes, then cooled down to 20° C., diluted with water and extracted with petroleum ether. The petroleum ether solution was washed with normal sodium hydroxide solution and with 1% sodium hydrogen carbonate solution, dried over sodium sulfate and concentrated by distilling off the solvent. Thus were obtained 129 g. of crude 3,7,9-trimethyl-2,6-decadien-1-al, which, when purified by bisulfite extraction and distillation yielded 95 g. of pure product; B.P.=102° C./0.8 mm., $n_D^{26}=1.4776$; absorption maximum in the ultraviolet spectrum at 238 m$\mu$ in alcohol. This aldehyde had a fine odor reminiscent of citrus fruits.

The allylic halide used as starting material in this example, 1-bromo-3,7,9-trimethyl-2,6-decadiene, can be prepared by the following procedure:

438 g. of 3,5-dimethyl-1-hexen-3-ol were stirred with 1500 ml. of concentrated aqueous hydrochloric acid (37% by weight HCl concentration) at room temperature for 30 minutes. The oil layer was separated, washed twice, each time with 500 ml. of water, and dried over calcium chloride. The product obtained, 1-chloro-3,5-dimethyl-2-hexene, had $n_D^{25}=1.448$.

In a five liter flask there were placed three liters of benzene, 429 g. of ethyl acetoacetate and 162 g. of sodium methylate. 428 g. of the product of the preceding paragraph, 1-chloro-3,5-dimethyl-2-hexene, were added at 60° C. within 30 minutes, and stirring was continued for six hours at 60°–70° C. The reaction mixture was washed with two liters of water and the benzene was distilled off under a vacuum of 100 mm. to yield 3-carbethoxy-6,8-dimethyl-5-nonen-2-one as a straw-colored oil.

The entire quantity of 3-carbethoxy-6,8-dimethyl-5-nonen-2-one produced above was dissolved in 2 liters of ethyl alcohol. To this were added 200 g. of solid potassium hydroxide and 200 ml. of water. The mixture was stirred for 4 hours at 40°–50° C. To the resulting solution of the potassium salt of 3-carboxy-6,8-dimethyl-5-nonen-2-one was then added concentrated aqueous hydrochloric acid (37% by weight HCl) from a separatory funnel until the solution was strongly acid. Thirty minutes were required for the addition. The solution was then stirred an additional hour at 50° C.

The reaction mixture was diluted with two liters of water and the oil layer was removed by means of a separatory funnel. The aqueous portion was extracted with 500 ml. of benzene. The combined oils were washed neutral with water and fractionated. The product, 6,8-dimethyl-5-nonen-2-one, distilled at 120° C./35 mm., $n_D^{25}=1.4432$.

In 1.5 liters of liquid ammonia there were dissolved 41.4 g. of metallic sodium. Acetylene gas was passed into the blue colored solution, until the color changed to white. The addition of acetylene was continued for an extra 30 minutes. Then a solution of 252 g. of 6,8-dimethyl-5-nonen-2-one, dissolved in 250 ml. of ethyl ether, was dropped in within 45 minutes. The stirring was continued for 15 hours while a slow stream of acetylene was bubbled into the reaction mixture.

The ammonia was thereupon evaporated from the reaction mixture with the aid of a slow stream of nitrogen. The residue was poured into 2 liters of 5% sulfuric acid. The oil layer was removed and washed neutral with water. On fractionation, 3,7,9-trimethyl-1-decyn-6-en-3-ol was obtained in a fraction distilling at 72° C./0.35 mm., $n_D^{25}=1.4598$.

189 g. of 3,7,9-trimethyl-1-decyn-6-en-3-ol were diluted with an equal volume of petroleum ether and placed in a flask with 18.9 g. of 5% lead-palladium-on-calcium carbonate catalyst [Lindlar, Helvetica Chimica Acta 35, 446 (1952)]. This was hydrogenated at one atmosphere gauge hydrogen pressure until 0.97 mol of hydrogen was consumed. On fractionation of the reaction mixture, there was obtained 3,7,9-trimethyl-1,6-decadien-3-ol, distilling at 129° C./20 mm., $n_D^{25}=1.4592$.

127 g. of 3,7,9-trimethyl-1,6-decadien-3-ol, dissolved in 500 ml. of absolute ether, were cooled to —10° C. To this were added slowly, with stirring, 85 g. of phosphorus tribromide, at such a rate as to keep the temperature in the reaction vessel below 0° C. The addition required one hour. The reaction mixture was stirred an additional hour at —5° C. and then poured into cold water. The organic layer was separated, washed with sodium hydrogencarbonate solution and with water, then dried over sodium sulfate. The solvent was driven off, yielding 164 g. of 1-bromo-3,7,9-trimethyl-2,6-decadiene, $n_D^{23}=1.487$.

Example 8

10 g. of 2-nitropropane were added slowly, while stirring and cooling to 10°–20° C., to a mixture of 6.9 g. of potassium hydroxide (85% pure), 8 ml. of water and 30 ml. of acetonitrile. Then a solution of 21.9 g. of 1-bromo-3,7-dimethyl-2-octene in 50 ml. of acetonitrile was added, and the mixture was stirred thoroughly for six hours at 25°–30° C. The reaction mixture was then worked up in the manner described in Example 1, yielding 15.4 g. of 3,7-dimethyl-2-octen-1-al. Upon purification of the latter by distillation in vacuo, a purified form of product was obtained having B.P. 86°–87° C., $n_D^{25}=1.462$. This aldehyde possessed a fragrance reminiscent of citrus.

Example 9

37.6 g. of 2-(2,6,6-trimethyl-1-cyclohexylidene)ethyl bromide in 100 ml. of dimethylformamide were mixed at once, while stirring and cooling to 25°–35° C., with a solution of 11.3 g. of potassium hydroxide (85% pure) and 16.2 g. of 2-nitropropane in 15 ml. of water and 50 ml. of dimethylformamide. The reaction mixture was stirred for 15 hours at about 25° C. and worked up in the manner described in Example 1. There were thus obtained 25 g. of 2,6,6-trimethyl-1-cyclohexylidene-acetaldehyde having an absorption maximum in the ultraviolet spectrum at 236.5 m$\mu$ (in petroleum ether). This product was purified by distillation and chromatography. Its phenylsemicarbazone had M.P. 130° C. and ultraviolet absorption maxima at 241 mμ and 284.5 mμ (in petroleum ether). This aldehyde can be converted to β-carotene by the method disclosed by Isler and collaborators at the XIV International Congress of Pure and Applied Chemistry in Zurich, 1955, as described in the Handbook of the Congress, Item 280.

The allylic halide used as starting material in this example, i.e. 2-(2,6,6-trimethyl-1-cyclohexylidene)ethylbromide, can be prepared by the following procedure:

Acetylene was introduced into a solution of 1.4 g. of lithium in 700 ml. of liquid ammonia, until no further reaction took place. Then 24.5 g. of 2,6,6-trimethyl-1-cyclohexanone were added and the mixture was stirred for 25 hours, taking precautions to exclude moisture. At the end of this time, 20 g. of ammonium chloride were added, and then the ammonia was driven off. The residue was taken up in diethyl ether, washed with water and dried over sodium sulfate; the ether was driven off and the residue was distilled in vacuo. There were thus obtained 28 g. of 1-ethinyl-2,6,6-trimethyl-1-cyclohexanol, B.P. 81°–83° C./10 mm.

The latter material (28 g.) was dissolved in 150 ml. of petroleum ether, and 0.3 ml. of quinoline and 3 g. of palladium-lead-calcium carbonate catalyst [Lindlar, Helvetica Chimica Acta 35, 446 (1952)], was added, and elemental hydrogen was introduced under a slight hydrogen overpressure until no further hydrogen was taken up (approximately 1 mol was absorbed). Then the catalyst was filtered off, and the filtrate was concentrated, yielding 28.3 g. of 2,6,6-trimethyl-1-vinyl-1-cyclohexanol, which were subjected to further reaction without being purified.

The entire amount of the last mentioned product was dissolved in 60 ml. of dry benzene and stirred for one hour at 50°–60° C. with a solution of 16.6 g. of phosphorus tribromide in 20 ml. of benzene. The reaction mixture was then poured upon ice, the organic layer was separated, washed with sodium bicarbonate solution and then with water, dried over sodium sulfate, and then the solvent was driven off, yielding 37.6 g. of 2-(2,6,6-trimethyl-1-cyclohexylidene)ethyl bromide.

*Example 10*

1 g. of 2-nitropropane was added slowly, while stirring and cooling with ice, to 0.66 g. of potassium hydroxide (85% pure) in 0.7 ml. of water and 3 ml. of dimethylformamide. The solution obtained was slowly added, while stirring and cooling to 20°–30° C., to a solution of 2.9 g. of 2-(4-acetoxy-2,6,6-trimethyl-1-cyclohexylidene)-ethyl bromide in 10 ml. of dimethylformamide. The reaction mixture was then stirred for 15 hours at room temperature and worked up in the manner described in Example 1. There were thus obtained 2.4 g. of 4-acetoxy-2,6,6-trimethyl-1-cyclohexylidene - acetaldehyde, having an ultraviolet absorption maximum at 231 mμ (in petroleum ether). The product was purified by chromatography. Its phenylsemicarbazone had M.P. 183°–185° C. and ultraviolet absorption maxima at 236 mμ and 283 mμ (in petroleum ether).

The allylic halide used as starting material in this example, i.e. 2-(4-acetoxy-2,6,6-trimethyl - 1 - cyclohexylidene)ethyl bromide, was prepared by the following procedure:

138 g. of 2,6,6-trimethyl-1-cyclohexen-4-one made from isophorone by known procedure in 50 ml. of glacial acetic acid were stirred for two hours at 0°–10° C. with 160 ml. of peracetic acid (containing 530 mg. of peracetic acid per ml.) and the mixture was allowed to stand overnight at 20° C. Then, while adding ice, the reaction mixture was made weakly alkaline (pH about 8) by adding 30% aqueous NaOH solution, and the reaction mixture was shaken for one hour at 20° C. Then the mixture was extracted twice, each time with 800 ml. of diethyl ether, and the ether solutions were washed once with 200 ml. of saturated ammonium chloride solution. The ether solutions were combined and dried over sodium sulfate, the solvent was driven off, and the residue was distilled in high vacuum. A forerun passed over between 70° and 80° C., and then 2,6,6-trimethyl-2-cyclohexen-1-ol-4-one was obtained as an almost colorless oil having B.P. 110°–112° C./0.1 mm., $n_D^{20}$=1.501, U.V. maximum at 226 mμ

($E_1^1$=1110 in petroleum ether solution)

after standing for some time. The phenylsemicarbazone had M.P. 189°–190° C., U.V. maxima at 240.5 mμ and 285 mμ

($E_1^1$=807 and 778 in ethanol)

To 154 g. of 2,6,6-trimethyl-2-cyclohexen-1-ol-4-one in 200 ml. of glacial acetic acid and 500 ml. of water were quickly added dropwise 70 g. of chromic anhydride in 200 ml. of water, while stirring and cooling, so that the temperature did not rise above 30° C. The mixture was then stirred overnight at 20° C. Then the reaction mixture was saturated with ammonium chloride and was extracted with 1000 ml. of petroleum ether (boiling range 30°–60° C.). The aqueous layer was again extracted in a second separatory funnel with 500 ml. of petroleum ether. The petroleum ether solutions were washed with saturated ammonium chloride solution to which a little ammonia had been added, and then with pure saturated ammonium chloride solution. The washed extracts were dried over sodium sulfate and the solvent was driven off. The product, 2,6,6-trimethyl-2-cyclohexene-1,4-dione, was distilled under a water pump vacuum; B.P. 92°–94° C./11 mm., a yellow oil which solidified in crystalline form in the refrigerator, $n_D^{21}$=1.490, U.V. maximum at 238 mμ

($E_1^1$=942 in petroleum ether)

The phenylsemicarbazone had M.P. 190° C., then re-solidified and melted again at 230° C., U.V. maxima at 242.5 mμ and 325.5 mμ

($E_1^1$=875 and 580 in ethanol)

65 g. of 2,6,6-trimethyl-2-cyclohexene-1,4-dione in 250 ml. of glacial acetic acid were slowly reacted with 130 g. of zinc dust, while stirring, so that the temperature did not rise above 50° C. Then the reaction mixture was stirred for an additional period of one hour. The reaction mixture was filtered, diluted with 1000 ml. of water and then saturated with ammonium chloride. The mixture was extracted twice, each time with 800 ml. of petroleum ether (boiling range 30°–60° C.). The petroleum ether solutions were washed with 300 ml. of saturated ammonium chloride solution to which some ammonia was added, and then were washed with pure saturated ammonium chloride solution. (In case a portion of the product crystallizes from the petroleum ether solution, it is filtered off, the crystalline material is dissolved in diethyl ether, then the diethyl ether solution is washed as indicated above, dried over sodium sulfate and then combined with the petroleum ether solution.) The solvent was driven off until the product 2,6,6-trimethyl-1,4-cyclohexanedione started to crystallize out; colorless needles, M.P. 63°–65° C., having no absorption maximum in the ultraviolet spectrum between 220 mμ and 280 mμ. The phenylsemicarbazone had M.P 218°–220° C., U.V. maximum at 250 mμ

($E_1^1$=1030 in ethanol)

10 g. of 2,6,6-trimethyl-1,4-cyclohexanedione, dissolved in 50 ml. of methanol, were shaken with elemental hydrogen, at atmospheric pressure and at room temperature and in the presence of 1 g. of Raney nickel, until approximately 1.475 ml. of hydrogen were taken up. Then the catalyst was filtered off, the solvent was driven off, and the residual crude 4-hydroxy-2,6,6-trimethyl-1-cyclohexanone (10 g.) was refluxed for two hours with 20 g. of acetic anhydride. The reaction mixture was poured upon 50 g. of ice and the whole was stirred overnight at room temperature. Then the reaction mixture was extracted with petroleum ether, the solvent was removed from the extract, and the residue was distilled in high vacuum, yielding 11 g. of 4-acetoxy-2,6,6-trimethyl-1-cyclohexanone as a viscous oil having B.P. 90°–91° C./0.2 mm., $n_D^{24}$=1.4560.

20 g. of the last mentioned product were added dropwise, over a period of 2 hours, to a solution of lithium acetylide prepared by introducing acetylene into a solution of 0.76 g. of lithium in 150 ml. of liquid ammonia. In order to complete the reaction, the reaction mixture was stirred for about 15 hours. At the end of this time, 6 g. of ammonium chloride were cautiously added, and then the ammonia was driven off. The residue was taken up in diethyl ether, then the solvent was driven off, and the residue was crystallized from petroleum ether, yielding 4-acetoxy-1-ethinyl-2,6,6-trimethyl-1-cyclohexanol as colorless crystals, B.P. 145°–148° C.

10 g. of the latter product, in a mixture of 50 ml. of ethyl acetate and 50 ml. of petroleum ether, were hydrogenated at normal pressure and temperature in the presence of 1 g. of lead-palladium-calcium carbonate catalyst [Lindlar, Helvetica Chimica Acta 35, 446 (1952)], and 0.2 ml. of quinoline, until 1.000 ml. of hydrogen was taken up. Then the catalyst was filtered off, the solvent was driven off, and the residue was crystallized from petroleum ether, yielding 4-acetoxy-2,6,6-trimethyl-1-vinyl-1-cyclohexanol, white needles, M.P. 178°–180° C.

22.6 g. of the last mentioned product, dissolved in 100 ml. of absolute benzene, were stirred with 10 g. of phosphorus tribromide in 50 ml. of absolute benzene for 30 minutes at 60° C., taking precautions to exclude moisture. Then the reaction mixture was poured upon ice and the whole was extracted with petroleum ether. The extract was washed with water, then the solvent was driven off, yielding the desired product 2-(4-acetoxy-2,6,6-trimethyl-1-cyclohexylidene)ethyl bromide, which was used without further purification.

*Example 11*

56 g. of 2-nitropropane were added slowly to 39 g. of potassium hydroxide (85% pure) in 50 ml. of water, while stirring and cooling to 25° C. The solution obtained was introduced slowly, while stirring and cooling to 20°–30° C., into a solution of 122 g. of 1-bromo-3,7-dimethyl-2,6-octadiene in 500 ml. of acetone, and the reaction mixture was stirred thoroughly for 6 hours at room temperature. Then a mixture of 40 ml. of aqueous sodium hydroxide solution (containing 30% by weight NaOH) and 200 ml. of water were added, while cooling, and the whole was stirred 15 hours longer at room temperature. The reaction mixture was then diluted with water and the reaction product was extracted with petroleum ether. The petroleum ether extract was washed with water, dried over sodium sulfate, and the solvent was distilled off. The residue was distilled in vacuo, yielding 65 g. of 6,10-dimethyl-3,5,9-undecatrien-2-one, B.P. 85°–87° C./0.04 mm., $n_D^{25}$=1.5297; ultraviolet absorption maximum at 292 mμ (in ethanol).

10 g. of 6,10-dimethyl-3,5,9-undecatrien-2-one were dissolved in 25 ml. of dry benzene. While stirring and cooling to 3°–5° C., boron trifluoride was introduced into the solution until about 3 g. of boron trifluoride were absorbed. The stirring was continued for 15 minutes at 15° C., and then the reaction mixture was poured onto ice. The reaction mixture was adjusted to pH 10 with 3 N aqueous sodium hydroxide solution, the aqueous layer was separated, washed with concentrated aqueous sodium hydroxide solution and then with saturated sodium bicarbonate solution, and was dried over anhydrous potassium carbonate. The benzene was driven off and the residue was distilled in a high vacuum, yielding 4-(2,6,6-trimethyl-2-cyclohexen-1-yl)-3-buten-2-one as a colorless oil. This ketone had a pleasant fragrance reminiscent of violets.

*Example 12*

6.9 g. of potassium hydroxide were dissolved in 11 ml. of water, diluted with 70 ml. of isopropanol, whereupon 9.8 g. of 2-nitropropane were added with stirring at 20° C. The mixture was stirred for further 5 minutes and 21.7 g. of 1-bromo-3,7-dimethyl-2,6-octadiene were added at once. The temperature was maintained at 40°–45° C. Once the exothermic reaction was over, the mixture was heated to 45° C. for 20 minutes, then cooled down to 20° C., and diluted with water. The oil layer which separated was taken up in 90 ml. of acetone. While stirring and cooling, a solution of 7.2 ml. of aqueous sodium hydroxide solution (containing 30% by weight NaOH) in 44 ml. of water was added to the acetone solution, and the reaction mixture was stirred for 15 hours at room temperature. The reaction mixture was then worked up as in Example 11, and the condensation product obtained was distilled in vacuo, yielding 11.5 g. of 6,10-dimethyl-3,5,9-undecatrien-2-one, B.P. 85°–87° C./0.04 mm.; semicarbazone M.P. 141°–142° C.

8.2 g. of 6,10-dimethyl-3,5,9-undecatrien-2-one were dissolved in 10 ml. of petroleum ether, and the solution was added slowly, at minus 5° C., while stirring, to a mixture of 15 ml. of glacial acetic acid and 34 g. of concentrated sulfuric acid. The reaction mixture was stirred for 15 minutes at minus 5° C., and for 20 minutes at plus 10° C., and then was poured upon ice. The organic product was extracted with petroleum ether, the extract was washed neutral, dried and the solvent was driven off. The residue was distilled in high vacuum, yielding 6.1 g. of 4-(2,6,6-trimethyl-1-cyclohexen-1-yl)-3-buten-2-one, B.P. 94°–97° C./0.9 mm., $n_D^{25}$=1.519; semicarbazone B.P. 148°–149° C. This ketone had a pleasant odor reminiscent of violets.

*Example 13*

130 g. of 1-bromo-3,6,7-trimethyl-2,6-octadiene in 500 ml. of acetone were reacted in the manner indicated in Example 11 with a solution of the potassium salt of 2-propane-nitronic acid (prepared from 56 g. of 2-nitropropane, 39 g. of potassium hydroxide [85% pure] and 50 ml. of water) and the reaction mixture was then mixed with 40 ml. of aqueous sodium hydroxide solution (containing 30% by weight NaOH) in 200 ml. of water. The reaction mixture was worked up in the manner described in Example 11. Upon distillation in vacuo, there were obtained 62 g. of 6,9,10-trimethyl-3,5,9-undecatrien-2-one, B.P. 105°–110° C./0.5 mm., $n_D^{25}$=1.5305, semicarbazone (from methanol) M.P. 169°–172° C.

The 6,9,10-trimethyl-3,5,9-undecatrien-2-one was cyclized by means of boron trifluoride in the manner described in Example 11, yielding 4-(2,5,6,6-tetramethyl-2-cyclohexen-1-yl)-3-buten-2-one, B.P. 86°–87° C./0.5 mm., $n_D^{25}$=1.499; phenylsemicarbazone M.P. 171°–172° C. This ketone had a pleasant fragrance reminiscent of iris.

The allylic halide used as starting material in this example, i.e. 1-bromo-3,6,7-trimethyl-2,6-octadiene, was prepared by the following procedure:

168 g. of 3,6,7-trimethyl-1,6-octadien-3-ol, dissolved in 500 ml. of absolute petroleum ether, were cooled to —5° C. To this were added slowly, with stirring, 121 g. of phosphorus tribromide at such a rate as to keep the temperature in the reaction vessel below 0° C. The addition required one hour. The mixture was stirred an additional hour at —5° C. and then poured into cold water. The organic layer was separated, washed with sodium hydrogencarbonate solution and with water, then dried over sodium sulfate. The solvent was driven off, yielding 220 g. of 1-bromo-3,6,7-trimethyl-2,6-octadiene, $n_D^{22}=1.496$.

Example 14

239 g. of potassium hydroxide were dissolved in 380 ml. of water, the solution was diluted with 2400 ml. of isopropanol and 346 ml. of 2-nitropropane were added slowly, while stirring, at 20° C. The mixture was stirred for further 5 minutes and 900 g. of 1-bromo-3,7,11-trimethyl-2-dodecene were added at once. The temperature was maintained at about 40°-45° C. Once the exothermic reaction was over, the mixture was heated to 45° C. for further 20 minutes, cooled down to 20° C., diluted with water and extracted with petroleum ether. The petroleum ether solution was washed with normal sodium hydroxide solution and with 1% sodium hydrogen carbonate solution, dried over sodium sulfate and concentrated by evaporating the solvent. 680 g. of crude 3,7,11-trimethyl-2-dodecen-1-al were obtained. This aldehyde was purified by bisulfite extraction and by distillation; B.P. 85° C./0.05 mm.; ultraviolet spectrum absorption maximum at 239 m$\mu$ in alcohol; $n_D^{25}=1.465$.

Example 15

A mixture of 2.45 g. of potassium hydroxide, 30 ml. of acetone and 3.5 g. of 2-nitropropane were mixed and stirred until the reaction was complete, then 10 g. of 1-bromo-3,7,11-trimethyl-2,6,10-dodecatriene were added and the mixture was stirred further at 40° C. for one hour. The reaction mixture was diluted with water, extracted with petroleum ether, whereupon the petroleum ether solution was washed with dilute aqueous sodium hydroxide solution, dried over sodium sulfate and freed from the solvent by distillation. There were obtained 8.3 g. of 3,7,11-trimethyl-2,6,10-dodecatrien-1-al, which was purified by chromatography and distillation;

$$n_D^{23}=1.4985$$

ultraviolet absorption maximum at 231 m$\mu$ in petroleum ether.

Example 16

A mixture of 16.5 g. of potassium hydroxide, 7 ml. of water, 200 ml. of acetone and 30 g. of 2-nitropropane was stirred until the reaction was complete, then 66 g. of (2-isopropyl-5-methylcyclohexylidene)ethyl bromide were added, the reaction mixture was stirred for 4 hours at 30°-35° C. and then for 10 minutes at 55° C. It was then diluted with water, extracted with petroleum ether, whereupon the petroleum ether solution was washed with dilute sodium hydroxide solution and with water, dried over sodium sulfate and freed from the solvent by distillation. There were obtained 52 g. of (2-isopropyl-5 - methyl - cyclohexylidene) - acetaldehyde, which was purified by distillation; B.P. 80° C./0.1 mm.; $n_D^{23}=1.495$; ultraviolet absorption maximum at 235 m$\mu$ in petroleum ether.

Example 17

As described in Example 16 for (2-isopropyl-5-methyl-cyclohexylidene)ethyl bromide, 67.5 g. of (2,2,6,6-tetramethylcyclohexylidene)ethyl bromide were reacted with a mixture of 16.5 g. of potassium hydroxide, 7 ml. of water, 200 ml. of acetone and 30 g. of 2-nitropropane. When working up the reaction mixture as described in the preceding example, 57 g. of (2,2,6,6-tetramethylcyclohexylidene)acetaldehyde were obtained. This aldehyde was purified by distillation; B.P. 68° C./0.14 mm.; $n_D^{22}=1.502$; ultraviolet absorption maximum at 240 m$\mu$ in petroleum ether.

Example 18

45 g. of 3-methyl-crotyl bromide were added within 15 minutes, while stirring and cooling to 24°-26° C., to a solution of 18 g. of potassium hydroxide and 29 g. of 2-nitropropane in 30 ml. of water and 50 ml. of dimethylformamide. The reaction mixture was stirred an additional hour, while cooling to 27°-30° C., and then poured into 100 ml. of ice water, and the mixture was extracted with petroleum ether. The petroleum ether extract was washed with dilute aqueous sodium hydroxide solution, dried over sodium sulfate, and the solvent was distilled off. There was thus obtained 16 g. of 3-methylcrotonaldehyde. Upon purification by distillation in vacuo, the material had B.P. 39°-40° C./30 mm. The 2,4-dinitrophenylhydrazone of this aldehyde had M.P. 183°-184° C. and an ultraviolet absorption maximum at 382 m$\mu$ (in chloroform).

This application is a division of our copending application Serial No. 605,462, filed August 22, 1956, now abandoned.

We claim:

1. A process of making an $\alpha,\beta$-unsaturated aldehyde which comprises mixing a 3,3-disubstituted allyl halide having the formula

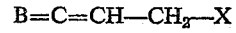

wherein the symbol X represents a halogen selected from the group consisting of chlorine and bromine, and the symbol group B=C= represents a disubstituted methylene radical selected from the group consisting of dialkylmethylene, alkylalkenylmethylene, cycloalkylidene and cycloalkylidene substituted in the ring only by at least one substituent of the class consisting of lower alkyl, lower alkoxy, lower alkanoyloxy, oxo and ethylenedioxy, with an alkali metal salt of a lower alkanenitronic acid.

2. A process of making a monoolefinic $\alpha,\beta$-unsaturated aldehyde which comprises mixing a 3-alkylcrotyl halide, the halide being selected from the group consisting of the chloride and the bromide, with an alkali metal salt of a lower alkanenitronic acid in the presence of an inert liquid diluent at temperatures between about —10° C. and 80° C.

3. A process of making a polyolefinic $\alpha,\beta$-unsaturated aldehyde which comprises mixing a 3-alkenylcrotyl halide, the halide being selected from the group consisting of the chloride and the bromide, with an alkali metal salt of a lower alkanenitronic acid in the presence of an inert liquid diluent at temperatures between about —10° C. and 80° C.

4. A process of making a cyclic $\alpha,\beta$-unsaturated aldehyde which comprises mixing 2-(2,6,6-trimethyl-1-cyclohexylidene)ethyl bromide with an alkali metal salt of a lower alkanenitronic acid in the presence of an inert liquid diluent at temperatures between about —10° C. and 80° C.

5. A process of making 3,7-dimethyl-2,6-octadien-1-al which comprises mixing 1-bromo-3,7-dimethyl-2,6-octadiene with an alkali metal salt of 2-propanenitronic acid in the presence of an inert liquid diluent at temperatures between about —10° C. and 80° C.

6. A process of making 3,7-dimethyl-2,6-octadien-1-al which comprises mixing 1-chloro-3,7-dimethyl-2,6-octadiene with an alkali metal salt of 2-propanenitronic acid in the presence of an inert liquid diluent at temperatures between about —10° C. and 80° C.

7. A process of making 2,6,6-trimethyl-1-cyclohexylideneacetaldehyde which comprises mixing 2-(2,6,6-trimethyl-1-cyclohexylidene)ethyl bromide with an alkali metal salt of 2-propanenitronic acid in the presence of an inert liquid diluent at temperatures between about —10° C. and 80° C.

References Cited in the file of this patent

UNITED STATES PATENTS 702,126     Chuit et al. _____ June 10, 1902

OTHER REFERENCES

Weisler et al.: J. Ab. Chem. Soc., vol. 67, pp. 1167–71 (1945).

Hass et al.: J. Am. Chem. Soc., vol. 71, pp. 1767–69 (1949).